(12) United States Patent
Tremp (10) Patent No.: US 12,077,463 B2
(45) Date of Patent: Sep. 3, 2024

(54) POSITIONING DEVICE FOR A PRELOADING RING OF A HOT FORMING MACHINE

(71) Applicant: SCHOTT PHARMA SCHWEIZ AG, St. Gallen (CH)

(72) Inventor: Marcel Tremp, Speicher (CH)

(73) Assignee: SCHOTT PHARMA SCHWEIZ AG, St. Gallen (CH)

( * ) Notice: Subject to any disclaimer, the term of this patent is extended or adjusted under 35 U.S.C. 154(b) by 0 days.

(21) Appl. No.: 16/936,585

(22) Filed: Jul. 23, 2020

(65) Prior Publication Data

US 2020/0354257 A1 Nov. 12, 2020

Related U.S. Application Data

(63) Continuation of application No. PCT/EP2019/050045, filed on Jan. 2, 2019.

(30) Foreign Application Priority Data

Jan. 23, 2018 (DE) .................... 10 2018 101 480.5

(51) Int. Cl.
 *C03B 23/11* (2006.01)
 *C03B 23/045* (2006.01)
(52) U.S. Cl.
 CPC .......... *C03B 23/114* (2013.01); *C03B 23/045* (2013.01)
(58) Field of Classification Search
 None
 See application file for complete search history.

(56) References Cited

U.S. PATENT DOCUMENTS 2,780,470 A * 2/1957 Ridout .................. C03B 23/045
 279/66
4,526,270 A 7/1985 Dichter

FOREIGN PATENT DOCUMENTS

| CN | 101671114 | 3/2010 |
| CN | 102180590 | 9/2011 |
| CN | 204385051 | 6/2015 |
| DE | 2456584 | 4/1976 |
| DE | 2821735 | 11/1978 |
| DE | 19506457 | 8/1996 |

(Continued)

OTHER PUBLICATIONS

CN205852578U abstract, Zhou et al., Crucible tongs, Jan. 2017 (Year: 2017).*

(Continued)

*Primary Examiner* — Queenie S Dehghan
(74) *Attorney, Agent, or Firm* — Ruggiero McAllister & McMahon LLC (57) ABSTRACT

A positioning device for a preloading ring of a hot forming machine is provided. The device has a first holding element and a second holding element. The first holding element has a first recess and a second recess. The second recess is at a distance radially with respect the first recess. The second holding element is arranged in a region of and faces the first and second recess. The first and second holding elements are configured and arranged movably about respective axes with respect to each other so that movement towards each other encloses a glass tube in each of the first and second recesses and between the holding elements.

10 Claims, 9 Drawing Sheets

(56) References Cited

FOREIGN PATENT DOCUMENTS

DE            19506457 A1 *    8/1996            B26B 13/06
DE            10354611          6/2005

OTHER PUBLICATIONS

DE 103 54 611 Schaud, D., Cable Shears, Jun. 2005 (Year: 2005).*
CN 202343842 machine translation, Zhang, A Pincher for forging manipulator, Jul. 2012 (Year: 2012).*
CN 202290092 abstract, Feng et al., Crucible tong, Jul. 2012 (Year: 2012).*
International Search Report dated May 15, 2019 for International Application No. PCT/EP2019/050045.
English Translation of the Written Opinion of the International Searching Authority dated May 15, 2019 for International Application No. PCT/EP2019/050045, 5 pages.
International Preliminary Report on Patentability dated Jul. 28, 2020 for International Application No. PCT/EP2019/050045, with English translation, 12 pages.

* cited by examiner

POSITIONING DEVICE FOR A PRELOADING RING OF A HOT FORMING MACHINE

CROSS REFERENCE TO RELATED APPLICATIONS

This application is a continuation of International Application PCT/EP2019/050045 filed Jan. 2, 2019, which claims benefit under 35 USC § 119 of German Application 10 2018 101 480.5 filed Jan. 23, 2018, the entire contents of all of which are incorporated herein by reference.

BACKGROUND

1. Field of the Invention

The invention relates to a positioning device for a preloading ring of a hot forming machine for pharmaceutical containers composed of glass tubes, comprising a first holding element with a recess, and a second holding element which is arranged in the region of the recess and faces the recess, wherein the holding elements are arranged movably with respect to each other in such a manner that, by means of a movement of the holding elements with respect to each other, a glass tube can be enclosed in the recess and between the holding elements. The invention furthermore relates to a hot forming machine.

2. Description of Related Art

Hot forming machines of the type mentioned at the beginning serve for the automated processing of glass in a plurality of processing stations which are generally arranged in a circular manner. They frequently serve for producing pharmaceutical containers, such as glass vials, cartridges or syringe bodies, and conventionally have, on their upper side, a preloading ring into which a respective glass tube of a length of approx. 1.5 m is placed annularly into a preloading position. The glass tube then drops downward at a defined point, for example by being pushed out of the preloading position via a corresponding opening through a holding chuck, and is then secured by the clamping jaws of the holding chuck such that the glass tube protrudes downward over the holding chuck by a certain length. At the downwardly protruding open end, the glass tube is subjected to certain processing operations which are carried out at different processing stations. For this purpose, the machine and, with the latter, the holding chuck are rotated by a certain angle from one processing position to the next. This takes place at a given cycle speed. Corresponding devices are known to a person skilled in the art, for example from U.S. Pat. No. 4,526,270 A and DE 2821735 A1.

Glass tubes of different diameters depending on the end product to be produced have to be delivered to the hot forming machine for processing. However, the positions of the glass tubes have to be exactly aligned with the holding chuck under the preloading ring for each diameter. Glass tubes of each diameter therefore have to be exactly positioned. In the preloading ring of current hot forming machines, the positioning devices used are clamps which have two holding elements, between which the glass tube is enclosed. Said holding elements frequently have recesses in which the glass tube lies. So that the different glass tube diameters are always positioned concentrically with respect to the holding chuck, dimension-dependent inserts are required in the current systems. With the nowadays conventional number of 20-24 processing positions and therefore 20-24 glass tube positions, this firstly means a correspondingly high number of inserts and also a comparatively long retooling time.

SUMMARY

It is therefore the object of the invention to specify a positioning device for a preloading ring of a hot forming machine that can be adapted for different glass tube diameters in a technically particularly simple and rapid manner.

This object is achieved according to the invention in that first of all the positioning element is designed as a holding clamp, wherein the holding elements are designed as substantially rectilinear limbs of the holding clamp, and wherein the respective movement of the limbs takes place about a respective axis, wherein the respective limb comprises a second recess which is at a distance radially with respect to the axis from the first recess and is arranged in such a manner that, by means of the movement of the holding elements with respect to each other, a second glass tube can be enclosed in the second recess and between the holding elements.

The invention proceeds here from the consideration that particularly simple adaptability of a positioning element to different tube diameters would be achievable if the dimensioning of the holding elements and of the recess for guiding the glass tubes did not have to be adapted manually, but could be changed in an automated and dynamic manner. For this purpose, an appropriate geometry of the holding elements is intended to be provided, the geometry providing different diameters for the guides of the glass tubes. In this connection, it has been surprisingly recognized that such a geometry can be achieved by the holding elements clamping the glass tube not being movable in one plane, for example in the manner of tongs, but rather by the two holding elements being movable in different, but mutually adjacent, planes, in the manner of shears. As a result, the holding elements not only can be moved together until they butt against each other, but can overlap, as a result of which new geometries for guiding the glass tube become possible. In particular, the movement radius of the holding elements in the positioning device is intended to be selected to be of such a size that the holding elements overlap in the region of the outer edges of the recess. By means of the overlap with the adjacent, other holding element, the opening, which is formed by the recess, for the glass tube is then reduced in size when the holding elements are moved together, and therefore hitherto unachievable guide geometries for smaller tube diameters arise. As a result, the positioning device can reliably guide or grip even smaller tube diameters without manual retooling.

The positioning element is furthermore designed in the manner of shears, into the limbs of which recesses for guiding the glass tube are introduced. By closing of the limbs, the glass tubes are securely held, wherein even glass tubes of smaller diameters can be securely held by the above-described overlap. However, in contrast to conventional shears, the limbs do not have to be secured in a common axis, but rather can also rotate about two different (but optionally symmetrically arranged) axes.

Finally, the respective limb comprises a second recess which is at a distance radially with respect to the axis from the first recess and is arranged in such a manner that, by means of the movement of the holding elements with respect to each other, a second glass tube can be enclosed in the second recess and between the holding elements.

This last-mentioned aspect of the invention relates to the problem that, in the case of current preloading rings, a glass tube is already intended to be reloaded again and held when the previously processed glass tube is still being held in the above-described holding chuck and has not yet been completely processed. For this purpose, pushers are already known on the lower preloading ring, said pushers pushing a glass tube out of an oblique preloading position into a rectilinear loading position, and therefore the glass tube can be placed into the preloading position while the loading position on the lower preloading ring is still occupied by a glass tube being currently processed. However, the clamps on the upper preloading ring are suitable only for holding a single glass tube.

The design of a positioning element in one of the above-mentioned ways as a holding clamp having two limbs moving toward each other as holding elements now makes it possible to create a second guiding or holding position for a second glass tube, by simple introduction of a further recess, and therefore a second glass tube can already be brought into a preloading position (the recess lying radially further on the outside) while the first glass tube is still in the loading position, without already having been dropped downward into a holding chuck.

In an advantageous refinement of the positioning element, the two holding elements and/or the respective movement thereof are mirror-symmetrical with respect to one another. The holding elements therefore have mirror-identical outer dimensions and recesses and always move mirror-symmetrically with respect to each other, but—as explained above—not in one plane, but rather in different, but mutually adjacent, planes. The effect that is achieved by the symmetry is particularly simple positioning and orientation in alignment with the holding chuck mentioned at the beginning since the opening which is formed by the holding elements and the recesses thereof is always centered in the axis of symmetry. An identical position of the tube axis is therefore produced for each tube diameter.

In an advantageous manner, the movement of the holding elements takes place in different planes in the manner of shearing, and wherein the movement extent is such that the holding elements can overlap at the outer edges of the recess. In a refinement in which the limbs are mounted rotatably about symmetrically arranged axes, it is of particular advantage if the limbs are connected on the side of the axis facing away from the recess via a respective connecting rod to a piston guided in the axis of symmetry. The effect that can be achieved by such an arrangement, by means of linear movement of the piston, i.e. a movement at only one engagement point, is a symmetrical movement of the two limbs since a corresponding movement of the limbs is brought about via the two (likewise symmetrical) connecting rods.

In a particularly advantageous refinement, the respective recess is designed as an indentation. An indentation is understood here as meaning an open recess in the form of a notch, i.e. a V-shaped, U-shaped or semicircular incision at the edge of the respective holding element. This is in particular contrary to a closed recess, such as, for example, an opening or hole. Said indentation or said indentations are introduced here into the respectively mutually facing sides of the holding elements or into the inner sides of the limbs.

In a further advantageous refinement, the inner sides of the limbs that are provided with the indentations form a straight line directed toward the respective axis of the limb, at least between the first and the second indentation. In other words: the inner contour of the limbs forms a straight line between the radially inner and the radially outer recess, said straight line being aligned in the axis of rotation of the respective limb. The effect achieved by this is that, when the limbs are opened, said limbs form a wedge-shaped opening between the indentations, and therefore, at a given opening angle, the opening width in the region of the radially inner recess is smaller than the opening width in the region of the radially outer recess. The effect achieved by this is that an opening angle (range) is produced in which a glass tube is still protected in the radially inner recess from dropping out since the opening width is smaller than the diameter of said glass tube, but at the same time a new glass tube can be placed in the radial direction into the radially outer recess since the opening width here is larger than the diameter of said glass tube.

An advantageous development of a symmetrically formed holding clamp having two guide positions for glass tubes relates to the contour of the indentations in the limbs: namely, advantageously, the first and the second indentation are designed in a wedge-shaped manner, wherein the opening angle of the indentation in the indentation lying radially further on the outside with respect to the axis is smaller than that of the indentation lying radially further on the inside, and therefore the two overlaps of respectively mirrored indentations each form a guide for glass tubes of identical diameter in each opening angle of the limbs. An increase in the opening angle between the two limbs leads namely at a greater radial distance to a greater widening of the opening between the limbs. This is intended to be compensated for by a corresponding configuration of the indentation contour. If the indentations are designed in a wedge-shaped manner and the guide positions are therefore formed in a diamond-shaped manner by opposite wedge-shaped contours, the larger opening between the limbs can be compensated for in the region lying radially further on the outside by an appropriately smaller opening angle of the wedge-shaped indentation.

A hot forming machine preferably comprises an upper preloading ring having an n-fold radially symmetrically arranged plurality of positioning devices which are designed as the above-described holding clamps, and a lower preloading ring which is arranged concentrically therebelow and has a positioning device which is designed as a guide ring, wherein the radial symmetry of the guide rings is likewise n-fold. In the lower preloading ring where the glass tubes do not need to be introduced in the radial direction, but rather the glass tubes merely need to be centered as they move through axially (during the dropping during the glass processing operation), the described design in the form of a guide ring can be used. By contrast, in the upper preloading ring where glass tubes are placed radially, the described holding clamps are intended to be used for the guiding and positioning. For each opening in the guide rings of the lower preloading ring, a holding clamp arranged thereabove is provided.

In an advantageous development of the hot forming machine, the lower preloading ring comprises an n-fold radially symmetrically arranged number of glass tube receptacles which each extend in a trough-shaped manner in the radial direction and, on their radially inner side, have an axial opening, said openings each being aligned with an opening of the guide rings. Such a design of glass tube receptacles is suitable in particular in conjunction with the holding clamps having two radially spaced-apart guiding positions, in order to define a preloading position and a loading position for a glass tube. In the preloading position, the glass tube is placed at the bottom into the radially outer side of the trough-shaped glass tube receptacle and is held at the top in the radially outer guiding position of the holding clamp. The glass tube can then be pushed into the loading position by a pusher, the glass tube being moved at the top into the radially inner guiding position of the holding clamp and being pushed at the bottom radially inward in the trough-shaped glass tube receptacle and therefore being brought above an opening of the guide rings where it is therefore reliably positioned above the holding chuck lying therebelow. The preloading position is therefore free again for a further glass tube.

The advantages obtained with the invention consist in particular in that, by means of an overlapping movement, configured in adjacent planes, of two holding elements of a positioning device, secure guiding of glass tubes of a wide variety of diameters in a hot forming machine is achieved. This concept can be used both for holding clamps in the manner of shears in the upper preloading ring and also for guide rings in the lower preloading ring. In both cases, considerable savings with regard to the retooling time arise since there does not have to be any manual adaptation to different glass tube diameters (in the case of the holding clamps) or the setting, in particular in the case of the guide rings, can take place simultaneously for all of the positions with an adjusting screw, instead of individually for each position. Furthermore, the described holding clamps in particular permit more gentle handling of the glass tube in respect of cosmetic defects.

The described positioning devices are also particularly suitable for guiding glass tubes in hot forming machines having a comparatively high cycle rate. In particular, by means of the movement and securing of the limbs of the clamps via the described piston-connecting rod mechanism, said limbs do not pivot during the cyclic operation of the hot forming machine, which eliminates friction between the clamps and the glass tube.

BRIEF DESCRIPTION OF THE DRAWINGS

Exemplary embodiments of the invention will be explained below with reference to drawings, in which.

Identical parts are provided with the same reference signs in all of the drawings.

DETAILED DESCRIPTION

Figure 1:
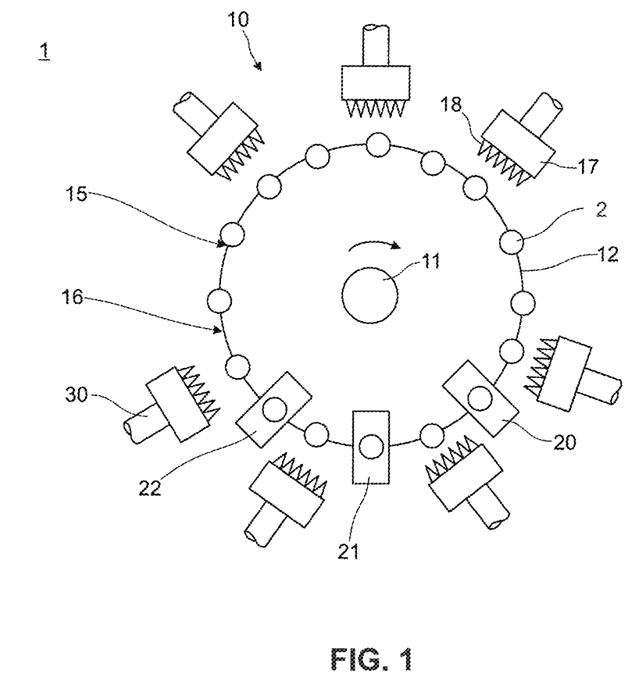
FIG. 1 shows parts of a hot forming machine in a schematic top view.

FIG. 1 shows, in a schematic top view, the basic design of a hot forming machine 1 which serves for producing glass containers from a glass tube 2 which is supplied from above in a vertically oriented manner. The glass containers to be produced, for example glass vials, cartridges or syringe bodies, serve for storing pharmaceutical active substances. The hot forming machine 1 here comprises what is referred to as a "mother machine" 10 which serves in particular for hot forming of the supplied glass tube 2 at an end opposite the subsequent bottom or open end of the glass container, in particular for the molding of a neck with a neck opening.

Figure 2:
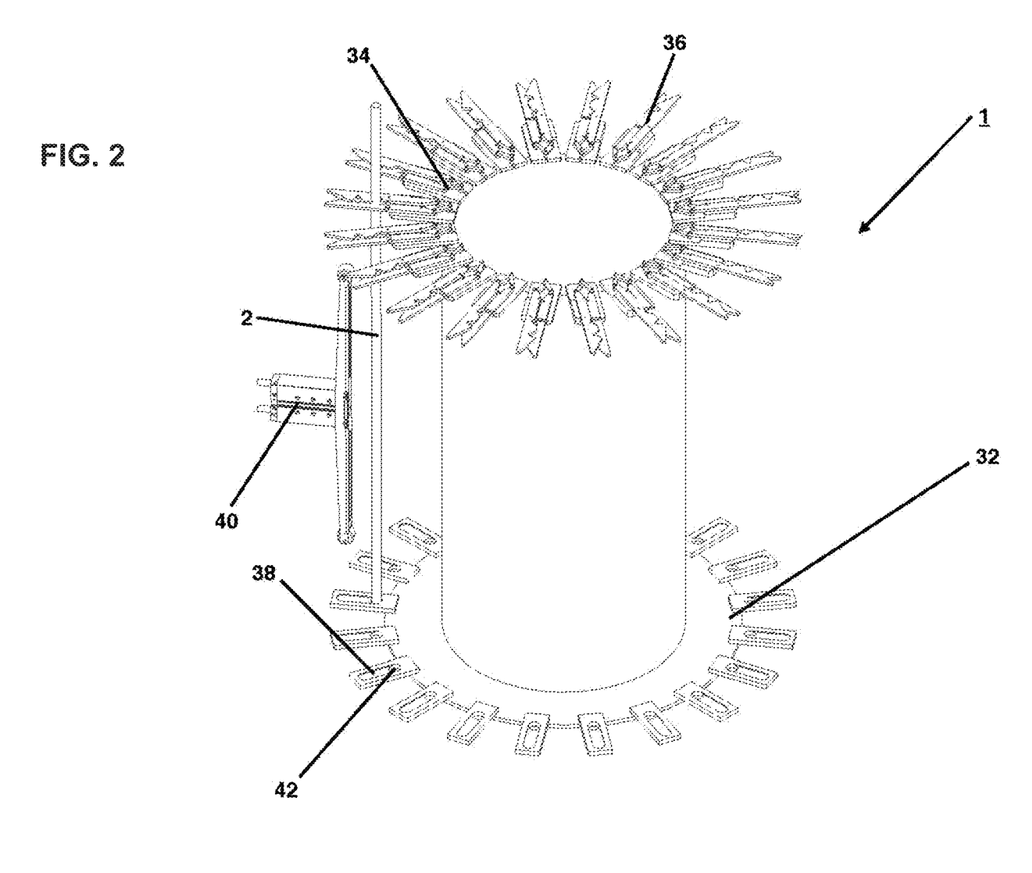
FIG. 2 shows the upper part of the hot forming machine having an upper preloading ring with holding clamps and a lower preloading ring with glass tube receptacles, in a perspective view.

Glass tubes 2 are supplied at the supply position 15 from a preloading ring, also illustrated in FIG. 2. They drop downward here by opening of a holding device in the preloading ring, are caught by a tube catcher (not illustrated), and are then held at a suitable processing height in holding chucks which are arranged distributed over the circumference of a turntable 12. The turntable 12 is designed in the manner of a rotary ring with holding chucks and is mounted rotatably on the associated pillar 11. The turntable 12 is rotated or pivoted in a stepwise manner about the associated pillar 11. In the process, the glass tubes 2 held at the holding chucks are guided in a stepwise manner past gas burners 17 and various processing stations 20-22 at which the processing and hot forming to form the glass containers takes place during a respective standstill time.

After passing the processing stations 20-22, the glass receptacles are checked non-tactilely at least in the region of the neck and the neck opening with the aid of an inspection system 30 and their properties are documented. The inspection system 30 can be, for example, a video camera with image evaluation software with which geometrical dimensions of the glass containers are evaluated with reference to the images recorded by the video camera, for example the geometrical dimensions in the case of glass vials. Finally, the glass containers are delivered at the position 16 to a downstream processing machine.

FIG. 2 shows, in a perspective view, the upper part of the hot forming machine 1 with a lower preloading ring 32, the design of which is also described in more detail in FIGS. 3-4C, and an upper preloading ring 34 having one of the number of holding clamps 36, the design of which is also described in more detail with reference to FIGS. 5A-5D. The upper and lower preloading rings 32, 34 are constructed in a radially symmetrical manner, wherein the order of symmetry corresponds to the number of rotational positions of the turntable 12.

FIG. 2 shows by way of example a glass tube 2 in a radially inner loading position, from which, by opening of a closure device, not illustrated specifically, said glass tube can leave the holding clamp 36 vertically downward and is then held in the lower holding chuck. Trough-shaped glass tube receptacles 38 which extend in the radial direction are arranged in the lower preloading ring 32 and, in the radially inner side of said glass tube receptacles, an opening 42, which is closeable by said closure device, is arranged in the bottom, and therefore the glass tubes 2 can drop here as described through the lower preloading ring 32. They are brought into this position by a pusher 40 which brings them out of an outer preloading position into the inner loading position. This is also explained in more detail in FIGS. 6A-C.

The glass tube receptacles 38 here provide a lower guide in which the glass tubes 2 can stand and in which they can be displaced only in the radial direction, wherein the radially inner opening 42 in the glass tube receptacles 38 forms a further depression of the trough, and therefore the glass tubes 2 are also secured there in the radial direction as soon as they are pushed into the opening 42. The opening 42 is closed underneath by said closure device and can be opened as required.

Figure 3:
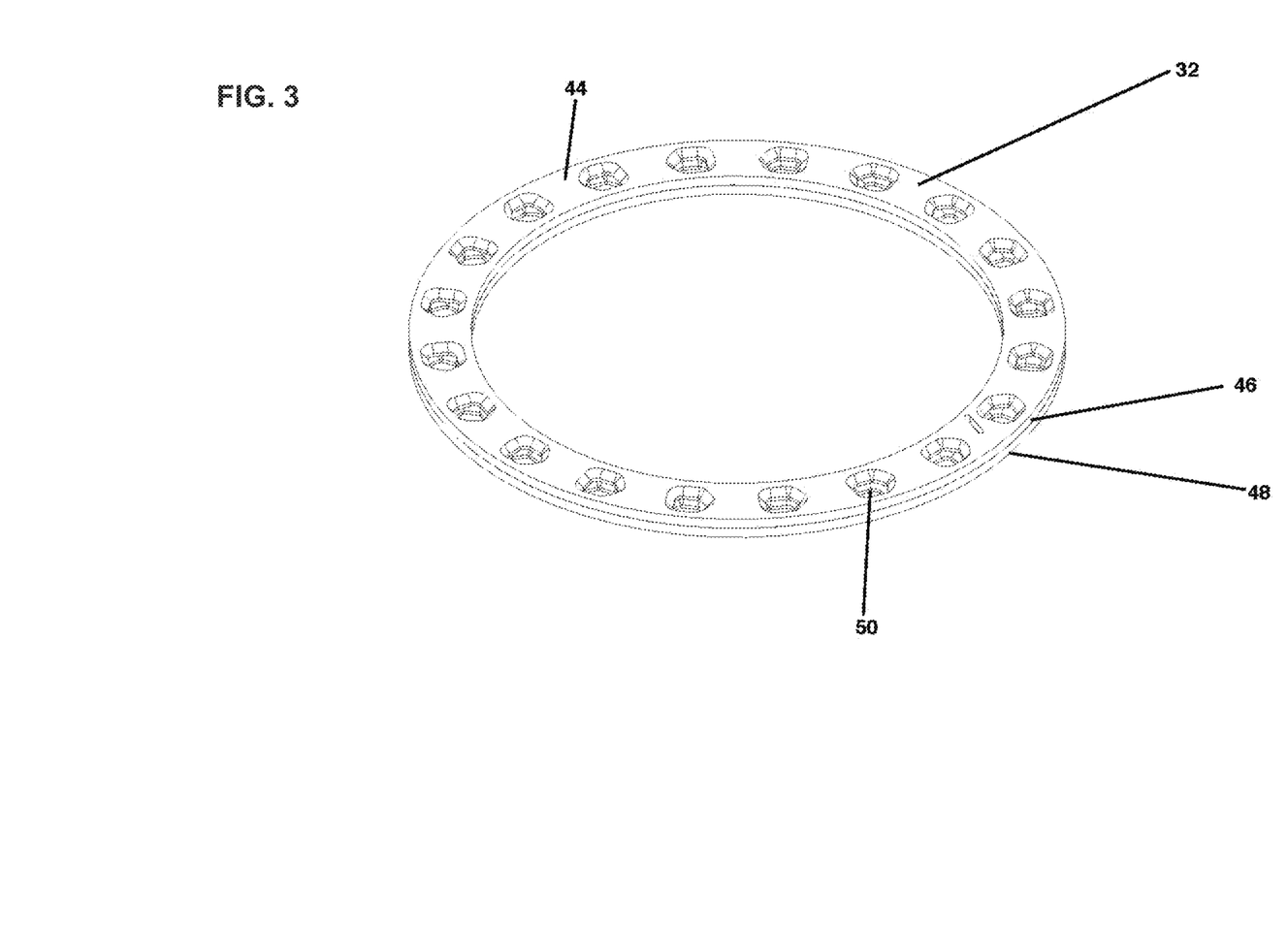
FIG. 3 shows guide rings arranged below the glass tube receptacles as holding elements of a first positioning device.

FIG. 3 shows the positioning device 44 of the lower preloading ring 32, said positioning device being arranged below the glass tube receptacles 38. Said positioning device comprises two concentric guide rings 46, 48 which are placed congruently one above the other and are in the form of circular disks. Said guide rings are designed substantially identically and have radially symmetrical openings 50 in the same order of symmetry as that of the glass tube receptacles 38. The two guide rings 46, 48 are essentially arranged in such a manner that their openings 50 are aligned with one another, and therefore a guide is produced for the glass tubes 4, but said guide rings can be rotated toward each other by means of an adjusting screw, not illustrated specifically, such that the resulting guide is reduced in size by the reduced overlapping of the openings 50.

Figure 4A:
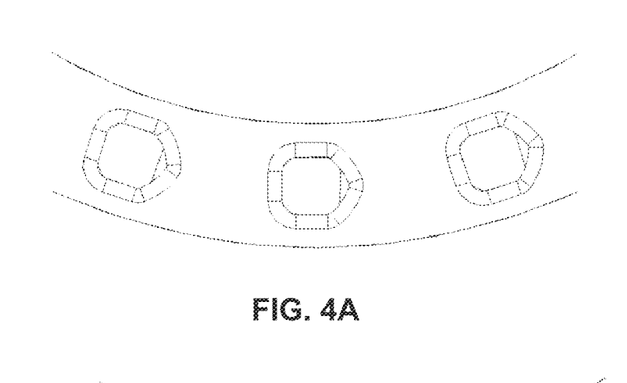
FIGS. 4A-C show parts of top views of the guide rings in different positions rotated toward one another.
Figure 4B:
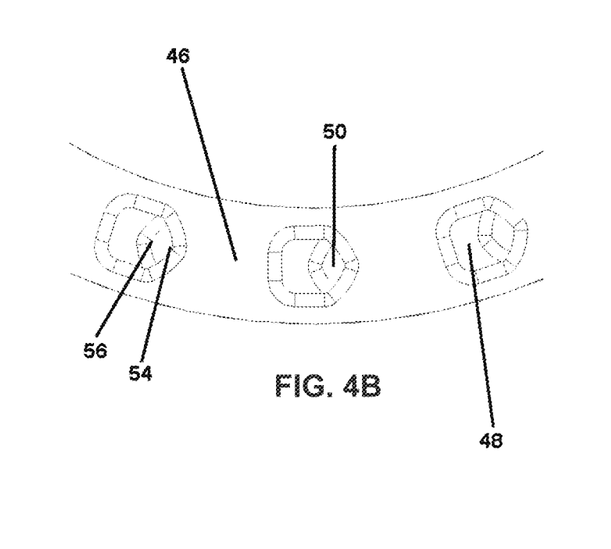
Figure 4C:
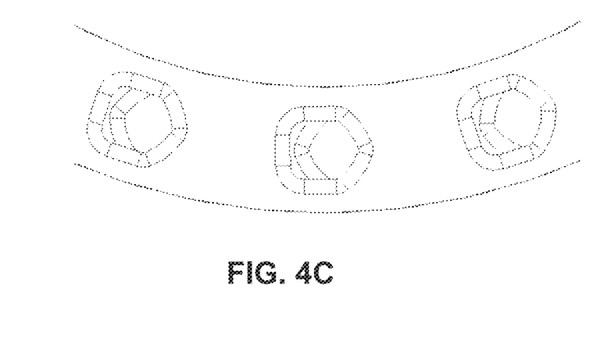

This is explained in more detail in FIGS. 4A-C, wherein reference signs are used only in FIG. 4B for clarity reasons only. FIGS. 4A-C show parts of the two guide rings 46, 48 in top view. The basic shape of each opening of the guide rings 46, 48 is square with rounded corners. In the case of the upper guide ring 46, the inner side 54 of each opening 50, which is arranged counterclockwise in the circumferential direction, are is recessed in a wedge-shaped manner. By contrast, a mirror-inverted arrangement is found in the case of the lower guide ring 48: here, the inner sides 56 of the openings 50, which are arranged clockwise in the circumferential direction, are recessed in a wedge-shaped manner. If the openings are in maximum overlap, guides of a maximum size for large tube diameters are produced. If, however, the guide rings are displaced toward each other by means of the adjusting screw, the inner sides 54, 56 of each guide move toward each other, and therefore diamond-shaped guides arise (because of the wedge shape) which become ever smaller with increasing convergence and are suitable for smaller tube diameters. The movement of the guide rings 46, 48 takes place symmetrically here, and therefore the center point of the guide always remains at the same location and only the extent of the guide is reduced.

Figure 5A:
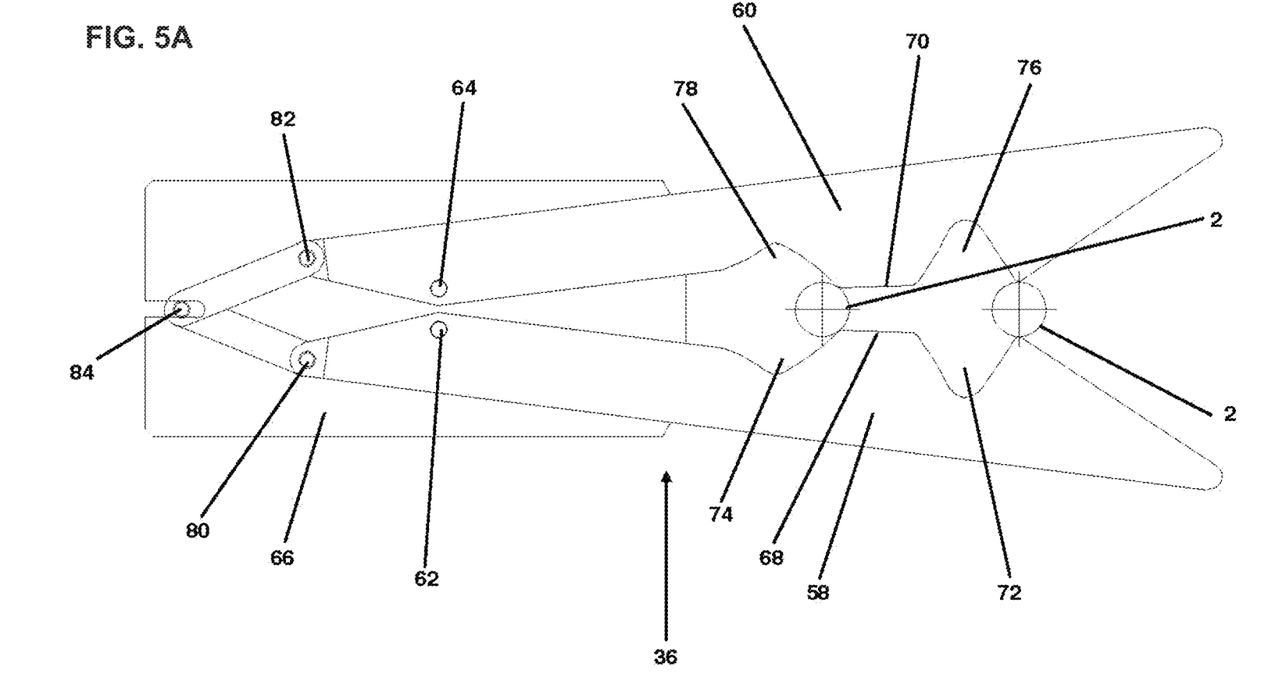
FIGS. 5A-D show parts of top views of a holding clamp as second positioning device at different opening angles of the limbs with glass tubes of different diameters.

FIGS. 5A-D show part of the holding clamp 36 in various opening states with glass tubes 2 of different diameters. For clarity reasons, only FIG. 5A is in turn provided with reference signs. The holding clamp 36 comprises two in rectilinear limbs 58, 60 which, like the entire arrangement, are formed mirror-symmetrically, but are arranged in two adjacent planes lying one above the other, and therefore they can overlap during a movement toward each other, similarly to shears. They are secured on a base plate 66 in two spaced-apart axes 62, 64.

The mutually facing inner sides 68, 70 of the limbs each have two radially spaced-apart, wedge-shaped indentations 72, 74, 76, 78 which have a rounded tip. According to the same principle as for the openings 50 of the guide rings 46, 48 in FIGS. 4A-C, said indentations can form differently sized guides for glass tubes 2 by overlapping to differing extents by means of the movement of the limbs 58, 60 toward each other. The radially outer indentations 72, 76 form a first guide for the preloading position and the radially inner indentations 74, 78 form a second guide for the loading position.

The movement mechanism of the limbs 58, 60 will first also be explained with respect to FIG. 5A. On the side of the axes 62, 64 that faces away from the indentations 72, 74, 76, 78, each limb is connected via a respective connecting rod 80, 82 to a piston 84 which is guided linearly in the axis of symmetry of the holding clamp 36. By means of this symmetrical arrangement, the limbs 58, 60 can be opened and closed and in particular can be brought in a symmetrical manner into a defined opening position only by driving and moving of the piston 84. This serves for defining certain opening states which are explained with reference to FIGS. 5A-D.

Figure 5B:
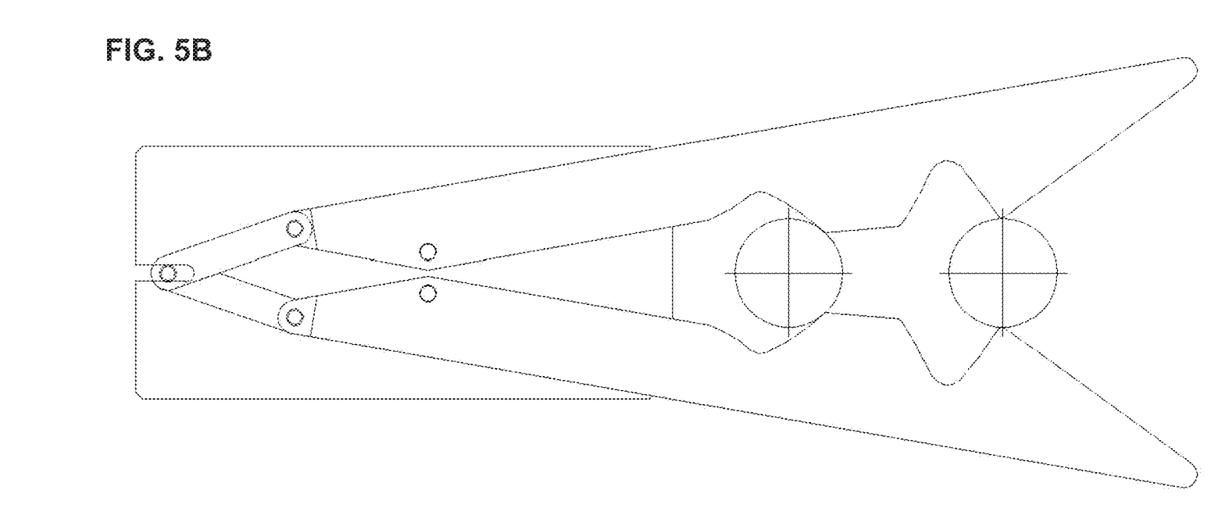

A first configuration feature is explained with respect to FIGS. 5A and 5B. Between the indentations 72, 74, 76, 78, each limb 58, 60 has a rectilinear contour of the inner side 68, 70 which is aligned with the respective axis 62, 64. The straight line of said contour continues—in each case interrupted by the radially outer indentation 72, 76—as far as the radial outer edge of the radially outer indentation 72, 76. The contours of the inner sides 68, 70 of the limbs 58, 60 then expand outward in the manner of a funnel in order to facilitate the radial introduction of a glass tube 2.

For different glass tube diameters, in the exemplary embodiment of glass tube diameters of 16-32 mm, the described geometry makes it possible to hold a first glass tube 2 in the guides formed by the inner indentations 74, 78 while a further glass tube 2 can be introduced radially from the outside. In FIGS. 5A and 5B, the opening angle of the limbs 58, 60 is in each case set in such a manner that the distance of the radial outer edges of the radially outer indentations 72, 76 corresponds to the diameter of a thinner glass tube 2 in FIG. 5A and a thicker glass tube 2 in FIG. 5B. For clarification, a glass tube 2 is in each case illustrated at this point. The glass tube 2 can therefore be introduced in each case from the outside into the guide formed by the radially outer indentations 72, 76. However, by means of the tapering of the distance of the inner sides 68, 70 of the limbs 58, 60 by the described geometry, the glass tube 2 cannot drop radially outward in the guide formed by the radially inner indentations 74, 78. Although it has a certain amount of play, it remains held loosely. As FIGS. 5A and 5B show, the geometry makes this possible for different tube diameters.

Figure 5C:
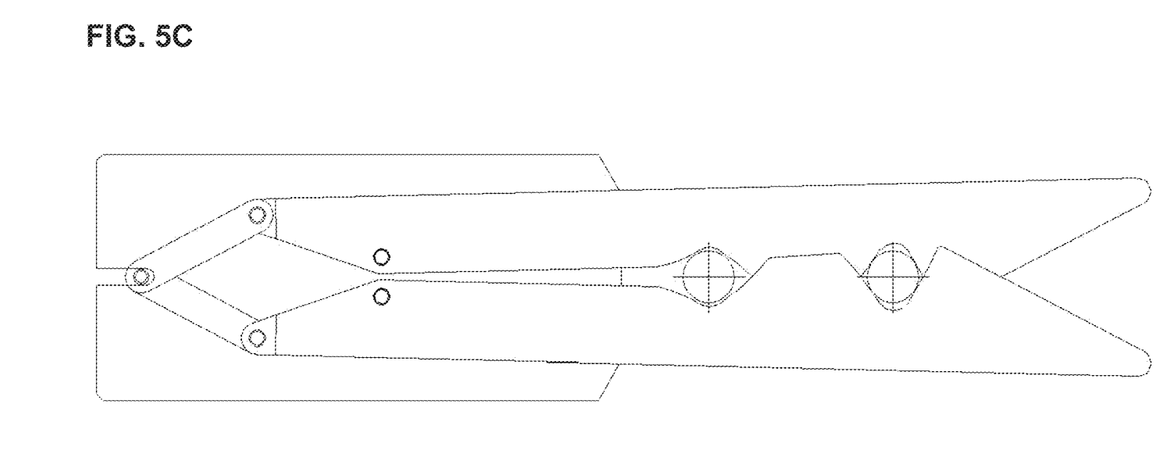
Figure 5D:
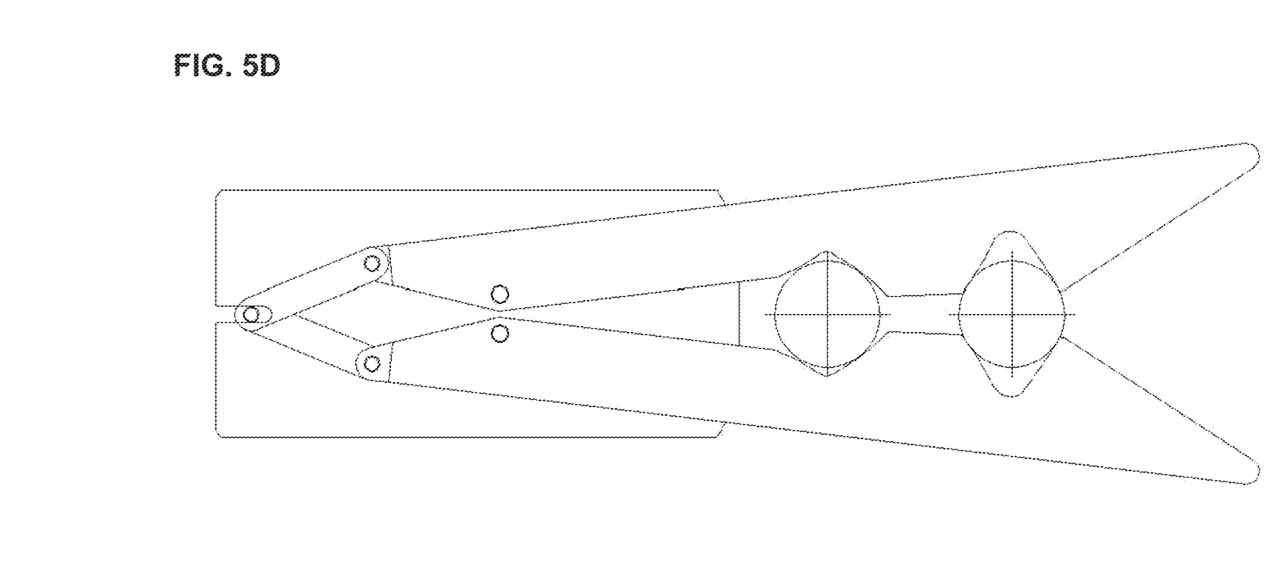

FIGS. 5A and 5B show the position of the holding clamp 36 during the operation of introducing a new glass tube 2. FIGS. 5C and 5D show closed positions of the limbs 58, 60, in which the glass tubes 4 in both guides are surrounded comparatively firmly. FIG. 5C shows that even particularly small glass tube diameters can be reliably surrounded by means of the overlapping of the limbs 58, 60.

The fact that even relatively large glass tube diameters can nevertheless also be held in a stable manner in the two guides is made possible by a further feature of the geometry shown: the radially outer indentations 72, 76 are wedge-shaped, but the opening angle of said wedge is smaller than the opening angle of the wedge shape of the radially inner indentations 74, 78. As the comparison of FIGS. 5C and 5D shows, in the closed position of the limbs 58, 60 the opening angle of the limbs 58, 60 is of course larger for larger glass tube diameters (FIG. 5D). The distance between the radially outer indentations 72, 76 is increased more sharply by the greater distance from the axes 80, 82 than the distance between the radially inner indentations 74, 78. However, this is compensated for by the smaller opening angle of the wedge shape of the radially outer indentations 72, 76, as FIG. 5D shows: in the outer guide of the radially outer indentations 72, 76, the glass tube 2 of larger diameter is also guided here just as closely is the glass tube 2 of smaller diameter in FIG. 5C.

Figure 6A:
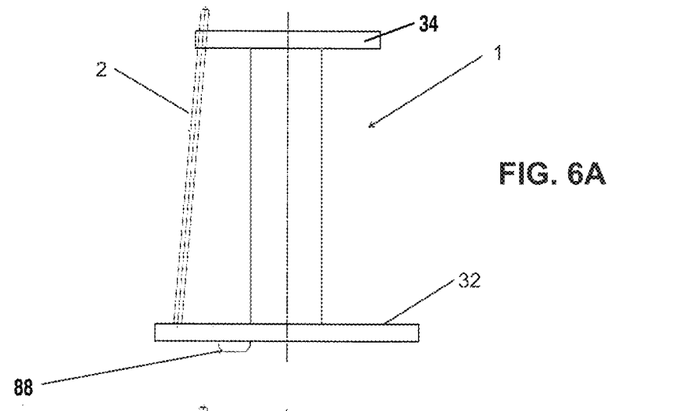
FIGS. 6A-C show a time sequence of the pushing process from a preloading position into a loading position, in a lateral view.
Figure 6B:
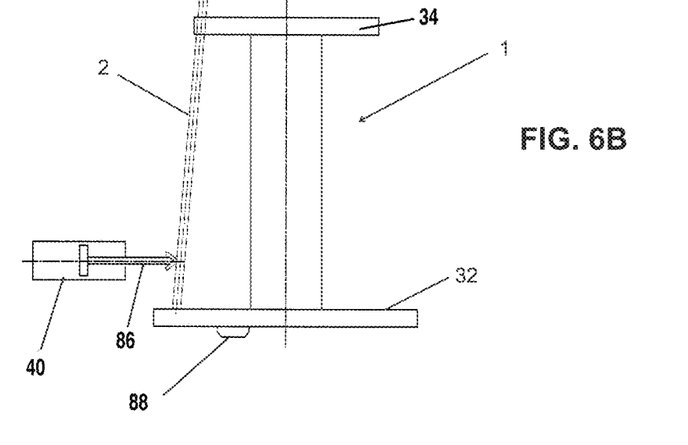
Figure 6C:
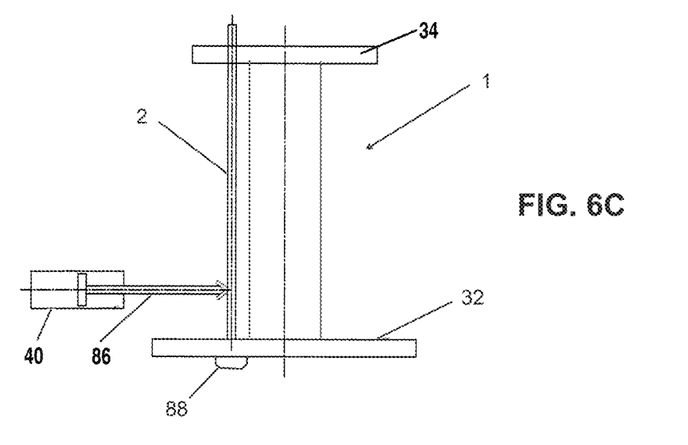

FIGS. 6A-C finally show, in a lateral view, the operation of pushing the glass tube 2 out of the preloading position into the loading position, as explained above. FIGS. 6A-C show a schematic side view of the upper part of the hot forming machine 1, shown in FIG. 2, with the upper preloading ring 34 having the holding clamps 36, no longer illustrated in detail here and with the lower preloading ring 32 having the positioning device 44 from FIGS. 3 and 4A-C.

In FIG. 5A, the glass tube 2 is located obliquely in a preloading position arranged radially further on the outside. Said glass tube is mounted at the top in the by the outer indentations 72, 76 of the holding clamp 36 and at the bottom in the radially outer position of the glass tube receptacles 38. In FIG. 5B, the preloading ring 32, 34 at a given cycle rate reaches the position in which the pusher 40 already shown in FIG. 2 is arranged. Said pusher has a piston 86 which is oriented exactly radially inward and—actuated pneumatically—pushes the glass tube 2 into a loading position, as shown in FIG. 5C. In the loading position, the glass tube 2 is arranged in the upper preloading ring 34 in the by the inner indentations 74, 76 of the holding clamp 36. In the lower preloading ring, said glass tube is arranged via the opening device 88 which has already been mentioned under the openings 42 in the glass tube receptacles 38. By means of the geometry of the holding clamps 36, a new glass tube 2 can now immediately be loaded again into the preloading position.

LIST OF REFERENCE SIGNS

| | |
|---|---|
| 1 | Hot forming machine |
| 2 | Glass tube or intermediate product |
| 5 | Vial |
| 6 | Cylindrical side wall |
| 7 | Shoulder |
| 8 | Neck |
| 9 | Rolled rim |
| 10 | Mother machine |
| 11 | Pillar with drive |
| 12 | Turntable |
| 15 | Supply section |
| 16 | Delivery section |
| 17 | Gas burner |
| 18 | Burner flame |
| 20 | First hot forming section |
| 21 | Second hot forming section |
| 22 | Third hot forming section |
| 30 | Non-tactile inspection system |
| 32 | Lower preloading ring |
| 34 | Upper preloading ring |
| 36 | Holding clamp |
| 38 | Glass tube receptacle |
| 40 | Pusher |
| 42 | Opening |
| 44 | Positioning device |
| 46, 48 | Guide ring |
| 50 | Opening |
| 54, 56 | Inner side |
| 58, 60 | Limb |
| 62, 64 | Axis |
| 66 | Base plate |
| 68, 70 | Inner side |
| 72, 74, 76, 78 | Indentation |
| 80, 82 | Connecting rod |
| 84 | Piston |
| 86 | Piston |
| 88 | Opening device |

What is claimed is:

1. A positioning device for a preloading ring of a hot forming machine, comprising:
    a first holding element with an inner indentation, an outer indentation, and a first rotation axis;
    a second holding element with an inner indentation, an outer indentation, and a second rotation axis, the inner indentations of the first and second holding elements facing one another to define an inner tube guide and the outer indentations of the first and second holding elements facing one another to define an outer tube guide;
    a base plate, the first and second holding elements movably secured on the base plate at the first and second axes, respectively, with the first and second axes spaced-apart from one another so that the first and second holding elements move between an open position and a closed position,
    the first and second holding elements being configured so that, in the closed position, the inner and outer tube guides each enclose a glass tube in the closed position, and
    the first and second holding elements being configured so that, in the open position, glass tubes can be moved between first and second holding elements along an axis of symmetry from the outer tube guide to the inner tube guide.

2. The positioning device of claim 1, wherein the first and second holding elements are mirror-symmetrical rectilinear limbs.

3. The positioning device of claim 1, wherein the first and second holding elements are arranged in two adjacent planes lying one above the other and overlap at an innermost movement towards one another.

4. The positioning device of claim 1, further comprising:
    a first connecting rod movably connected to an end of the first holding element on an opposite side of the first axis from the first tube guide; and
    a second connecting rod movably connected to an end of the second holding element on an opposite side of the second axis from the second tube guide.

5. The positioning device of claim 4, further comprising a piston connected to each of the first and second connecting rods, wherein movement of the piston along the axis of symmetry moves the first and second holding elements between the open and closed positions.

6. The positioning device of claim 1, wherein the inner and outer tube guides have an identical diameter in the closed position.

7. The positioning device of claim 1, wherein the outer tube guide defines a preloading position and the inner tube guide defines a loading position.

8. The positioning device of claim 1, wherein the inner and outer indentations of the first and second holding elements, respectively, are wedge-shaped having a rounded tip.

9. A hot forming machine comprising the positioning device of claim 1.

10. A positioning device for a preloading ring of a hot forming machine, comprising:
    a first holding element with a first recess and a second recess; and
    a second holding element arranged in a region of and facing the first and second recesses,
    wherein the first and second holding elements are configured and arranged movably about respective axes so that movement towards each other encloses a glass tube in each of the first and second recesses and between the holding elements, and
    wherein the first and second holding elements are connected via a first and second respective connecting rod to a piston that is guided in a direction along an axis of symmetry.

* * * * *